(12) United States Patent
Rosel et al.

(10) Patent No.: US 7,042,457 B2
(45) Date of Patent: May 9, 2006

(54) METHOD AND SYSTEM FOR REAL-TIME ANALYSIS AND DISPLAY OF CURVE CONNECTION QUALITY

(75) Inventors: Sebastien Rosel, Gif sur Yvette (FR); François Melocco, Boulogne-Billancourt (FR)

(73) Assignee: Dassault Systemes, Suresnes Cedex (FR)

( * ) Notice: Subject to any disclaimer, the term of this patent is extended or adjusted under 35 U.S.C. 154(b) by 880 days.

(21) Appl. No.: 09/898,804

(22) Filed: Jul. 3, 2001

(65) Prior Publication Data

US 2003/0065487 A1    Apr. 3, 2003

(51) Int. Cl.
*G06T 11/20*    (2006.01)
(52) U.S. Cl. ...................................... 345/442
(58) Field of Classification Search ................ 345/442, 345/687, 581, 441
See application file for complete search history.

(56) References Cited

U.S. PATENT DOCUMENTS

| | | | | |
|---|---|---|---|---|
| 5,883,631 A | | 3/1999 | Konno et al. ............... | 345/423 |
| 6,268,871 B1 * | | 7/2001 | Rice et al. .................. | 345/442 |

FOREIGN PATENT DOCUMENTS

| | | |
|---|---|---|
| CA | 2345464 | 9/1999 |
| EP | 0 908 850 | 4/1999 |
| WO | WO 00/17819 | 3/2000 |

OTHER PUBLICATIONS

David Byrnes, "Shape and Sculpt with Vellum Solids 2000", Apr. 2000, Pgs. 1-11, Cadalyst Labs Website.
Search Report from European Patent Application No. 02291632 dated May 10, 2004.
S. Kuriyama, "Generation of $G^n$ Multisided Patch Surfaces," *Systems and Computers in Japan,* vol. 24, No. 4, 1993, pp. 46-54.
M. Schichtel, "$G^2$ Blend Surfaces and Filing of *N*-Sided Holes," *IEEE Computer Graphics and Applications,* vol. 13, No. 5, 1993, pp. 68-73.
Canadian Office Action dated Dec. 9, 2004 from corresponding application No. 2,390,881.
James D. Foley et al., "Fundamentals of Interactive Computer Graphics," *Addison-Wesley Publishing Company,* Jul. 1984, pp. 69-71 and 74-77.

* cited by examiner

*Primary Examiner*—Richard Hjerpe
*Assistant Examiner*—Michelle K. Lay
(74) *Attorney, Agent, or Firm*—Clifford Chance US LLP

(57) ABSTRACT

A method and system for indicating curve connection continuity information in a graphical design system comprises steps and apparatus for determining values for measures of G1, G2, and G3 continuity at a junction point between curves. The continuity values are selectively displayed in a graphical display as respective tags adjacent or otherwise associated with the junction point at issue. The tags are updated as the shape of the curves are altered to provide a designer with a substantially real-time indication of the continuity of the curve junction. The display format of the tags can be altered to indicate when the respective continuity measure is within a predefined continuity tolerance level.

46 Claims, 9 Drawing Sheets

METHOD AND SYSTEM FOR REAL-TIME ANALYSIS AND DISPLAY OF CURVE CONNECTION QUALITY

FIELD OF THE INVENTION

The present invention is related to curve and surface modeling tools for use in CAD and related software design systems and, more particular, to a method and system which aids a designer in producing high quality connections between curves and surfaces.

BACKGROUND

Freeform computer modeling applications, such as CAD, CAM, CAE and other similar systems, enable operators to create and modify curves and surfaces. One principal use of these systems is in the design of 2D or 3D shapes which are used for animation or manufacturing purposes. In a typical shape, such as a side panel of an automobile, the electronic representation of the component is made of several separate sub-elements which are combined by the designer. A significant challenge facing designers of such multi-part shapes is to obtain high quality connections between the curves and the surfaces in the various sub-elements. In particular, when two different curves or curved surfaces must be joined together, the designer is often required to make the transition between one curve and the other as smooth as possible. If the transition is abrupt, the quality of the surface in the manufactured product may not be visual appealing.

The quality of a connection can be measured at several levels of continuity, conventionally designated as G0 through G3. Briefly, a connection which is G0 has positional continuity resulting from a common extremity or border, i.e., the elements are connected. A G1 continuity exists when tangents at the junction point are co-linear. A lack of G1 continuity produces an edge in the combined curve or surface. Two curves or surfaces are G2 continuous at their junction when there is a G1 continuity and the amplitudes of curvature are equal at the junction point. Finally, a G3 continuity exists at a curve or surface junction when the tangents of the curvature envelopes are co-linear at the junction point. If joined curves or surfaces are not G2 and G3 continuous, reflections from the modeled object can contain visual artifacts, such as unexpected bends or kinks, which could detract from the overall appearance.

In conventional CAD systems, continuity between curves and surfaces is initially evaluated visually by the designer. In addition to viewing a representation of the curve or surface on a display, a designer can also utilize a "reflect curve" display which shows how an array of parallel lines would appear if reflected from joined surfaces or from a surface extruded from joined curves. This visualization technique, also known as a "Zebra" analysis, shows disjointed stripes at a G0 discontinuity. When there is a G1 discontinuity, the surfaces show stripes that may be continuous, but have kinks at the junction. Surfaces having a G2 continuous junction show generally smoothly flowing stripes but there can be more subtle defects caused by a G3 discontinuity.

While it is often essential that designers of automobiles, consumer goods, and other products develop models which have surface junctions that are at least G2 continuous, it can be difficult to determine when this level of continuity is reached. A reflect curve analysis provides some degree of feedback but the process must still rely upon the operator's visual judgment about the quality of the reflect curves. Although adequate for assessing G0 and G1 continuity, it can be difficult to determine when a G2 continuity is reached using reflect curve analysis and even more difficult to assess how close joined curves or surfaces are to being G3 continuous.

Moreover, a perceived continuity between joined curves or surfaces might also be caused by visualization artifacts, such as poor display resolution or round off errors at very large zoom factors, even when the junction is not continuous. Such an error can be costly to correct since it might not be detected until late in the design phase. In addition, for some shapes, high quality connections are impossible to obtain and thus some level of discontinuity at the junction points is permissible. However, conventional modeling tools provide insufficient feedback to permit a designer to evaluate how far from "high quality" a connection is and whether it meets required minimum levels of continuity.

Accordingly, there is a need for an improved method to indicate the quality of curve connections to permit highly continuous curves to be more easily defined.

SUMMARY OF THE INVENTION

According to the invention, a graphical design system is provided which includes visual feedback that indicates a level of continuity at a junction between two curves. The feedback data can be shown in "tags" adjacent the curves and can be displayed along with a curvature envelope and comb display for the curves. The preferred implementation is configured to provide feedback relative to degrees of G1, G2, and G3 continuity at a junction point. However, the invention can be adapted to provide feedback related to an arbitrary number of continuity levels G1 through Gn.

In accordance with the invention, After a G0 junction continuity is achieved, a G1 continuity tag can be displayed which indicates a measure of the angle between lines normal to the tangent to each curve at the junction point. The angle can also be visually emphasized at the junction point, e.g., by extending the normal vectors from the junction point beyond the curvature envelope display.

A G2 continuity measure is a difference between the curvature amplitudes of the two curves at the junction and is preferably displayed as a percentage of a difference in magnitude between the two curvature amplitudes at the junction so that the value is scale-independent. The G2 value can be displayed adjacent the curvature envelope for the two curves near a point where the amplitude difference is visible in a comb display and the difference in amplitude can be emphasized by adding reference lines or other reference icons. A G3 continuity measure is the angle between lines tangent to the curvature envelope for each curve at the junction point. The magnitude of this angle can be displayed and the angle itself visually enhanced by showing the tangent lines on the respective curvature envelope and the angle value adjacent these lines.

According to a further aspect of the invention, higher orders of continuity at a junction can also be determined and displayed. Continuity measurements essentially measure increasing derivatives of the shape of the joined curves at the point of junction. While most product designs do not need to consider continuity levels greater than G3, some product designs, particularly optical systems in which multiple reflections may be present, must also consider higher continuity levels as well. For example, some advanced telescope designs require G4 continuity at the junction between reflecting surfaces.

The display of the various continuity measures can be enabled upon reaching a minimum specified continuity level at the junction point. Continuity measurements are preferably indicated as numeric values. However, they can also be represented iconagraphically using variable images such as a "fuel gauge", a multi-bar display, or similar image. The continuity tag display can be altered if the continuity value is within a specified tolerance level, for example, by changing the color or format of the continuity tag.

The various continuity measures can be determined in substantially real-time as the shape of the curves at the junction point are modified by the designer and the corresponding continuity tag display updated accordingly. This provides instant and accurate feedback regarding the continuity of the junction and the effect of the curve modification on the various levels of continuity. As a result, a designer can adjust the junction point to meet continuity requirements more quickly and easily than is possible using conventional design systems.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
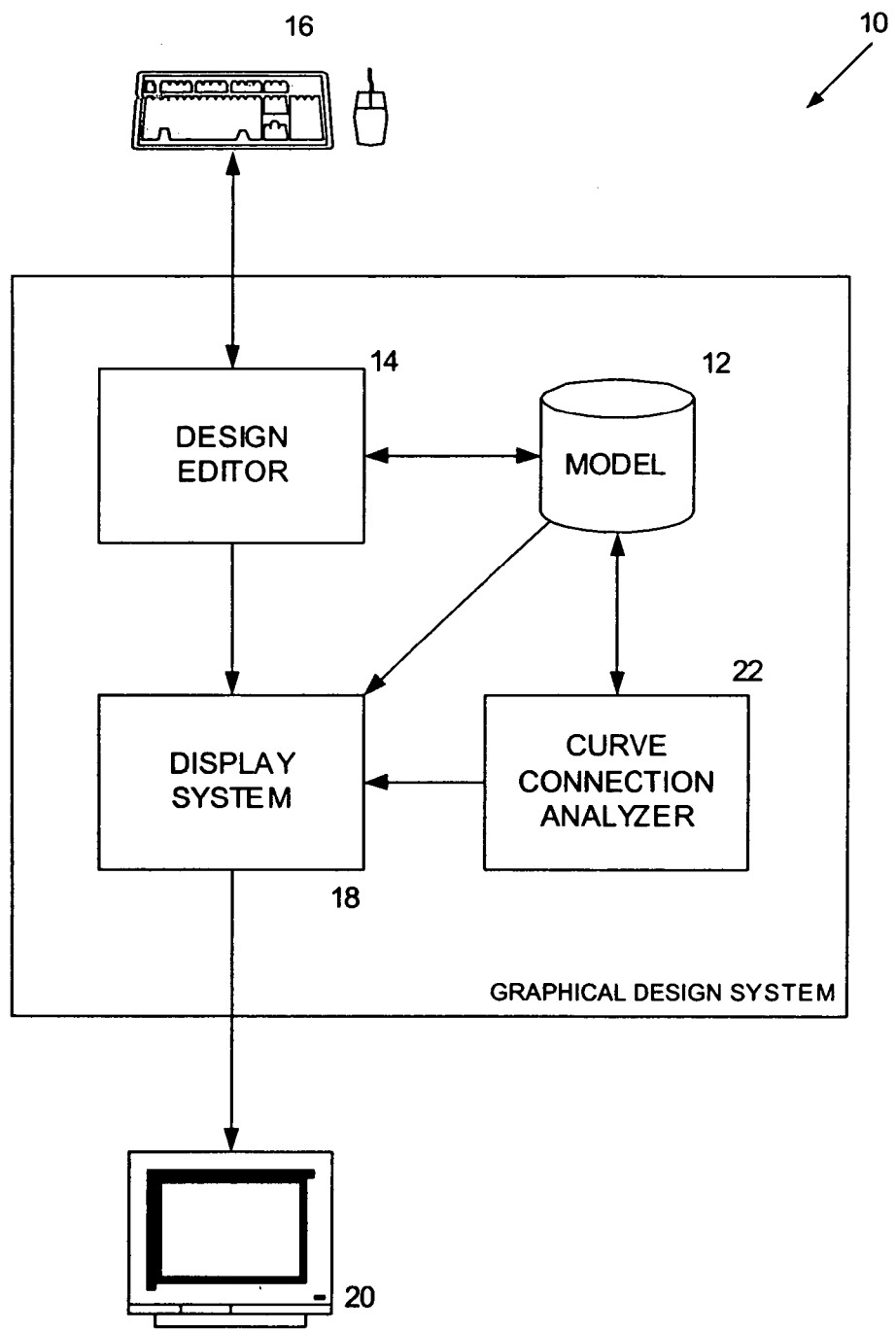
FIG. 1 is a block diagram of a graphical design system incorporating the present invention.

FIG. 1 is a block diagram showing a graphical design system 10 which incorporates the continuity feedback system of the present invention. A typical graphical design system 10, such as a CAD, CAM, CAE, or other similar design system, includes a data storage area 12 for storing the defined model and an editor 14 to allow a designer to specify and change a model using an appropriate input device 16, such as a keyboard or mouse. A display system 18 operates on the model and produces a graphical visualization of the various curved surfaces and other objects in a format which can be displayed on an appropriate output device 20.

In accordance with the present invention, the graphical design system further comprises a curve connection analyzer module 22 which analyzes selected pairs of adjoining curves or surfaces and produces an indication of the continuity quality between the curves or surfaces at the junction. This indication is processed by the display system 18 and shown as part of the object image on display 20. As discussed more fully below, the curve connection analyzer 22 can continually analyze the continuity and provide continuity feedback in substantially real time. This feedback permits a designer to quickly and easily adjust curve and surface parameters to meet specified continuity requirements.

Continuity measurements essentially measure increasing derivatives of the shape of the joined curves at the point of junction. The system can provide feedback relating to values of continuity measures from G1 through Gn. Preferably, continuity measures for G1–G3 are provided. However, higher orders of continuity at a junction can also be determined and displayed. Junction continuity measures of G4 or higher can be useful when designing systems in which there can be reflections between multiple surfaces which emphasize effects of a discontinuity. For example, some advanced reflecting or catadioptric telescope designs require that the junction between certain reflecting surfaces be G4 continuous.

It should be noted that under a strict mathematical interpretation, a junction between curves cannot be Gn continuous unless it is first G(n–1) continuous. However, the present invention considers the continuity values at a junction in a less rigorous manner. Accordingly, for example, a junction between curves can have an "apparent" G3 continuity when the tangents to the curvature envelopes of the respective curves at the junction point are parallel even if the tangents are not co-linear, as would be the case if the curves were G2 continuous at the junction.

The curve connection analyzer module 22 can be incorporated as a software routine within any appropriate portion of the graphical design system. The particular implementation of the curve connection analyzer 22 is dependent on the structure of the design system 10 and appropriate techniques for adding this module to the system 10 will be known to those of skill in the art.

Figure 2:
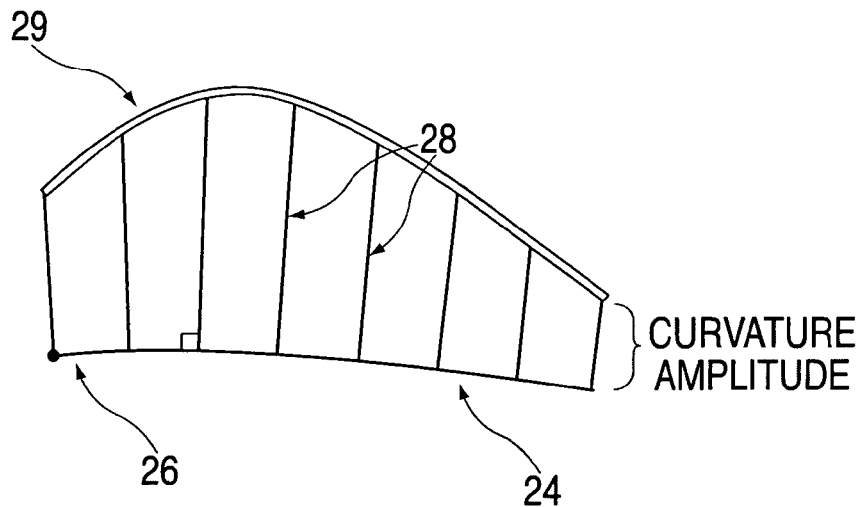
FIG. 2 is an illustration of a conventional curvature envelope display.

FIG. 2 is an illustration of a conventional curvature envelope display. The illustrated curve 24 has an end point 26. A "comb" display 28 is shown over the curve 24 and is comprised of a plurality of lines or curvature spikes which extend normal to the curve 24 and have a length which indicates the amplitude of the curvature at the point where the line 28 joins the curve 24. The amplitudes represented by the set of curvature spikes 28 defines a curvature envelope 29 which generally indicates the overall rate at which the curve amplitude changes along the curve. A line tangent to the curvature envelope 29 indicates the rate at which the curvature amplitude is changing at the corresponding point on the curve (e.g., the amplitude acceleration).

Figure 3:
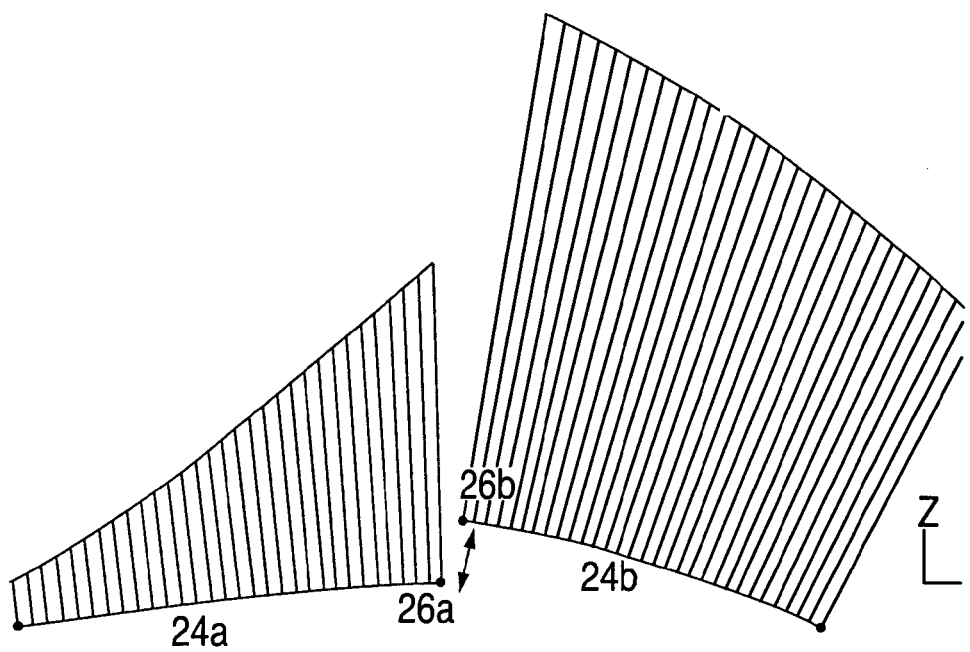
FIG. 3 is an illustration of a G0 discontinuity between two curves.

FIG. 3 is an illustration of a pair of curves 24A, 24B with respective end points 26A, 26B. As shown, the end points are not connected to each other and, therefore, the "junction" between the curves is considered to be G0 discontinuous.

Figure 4:
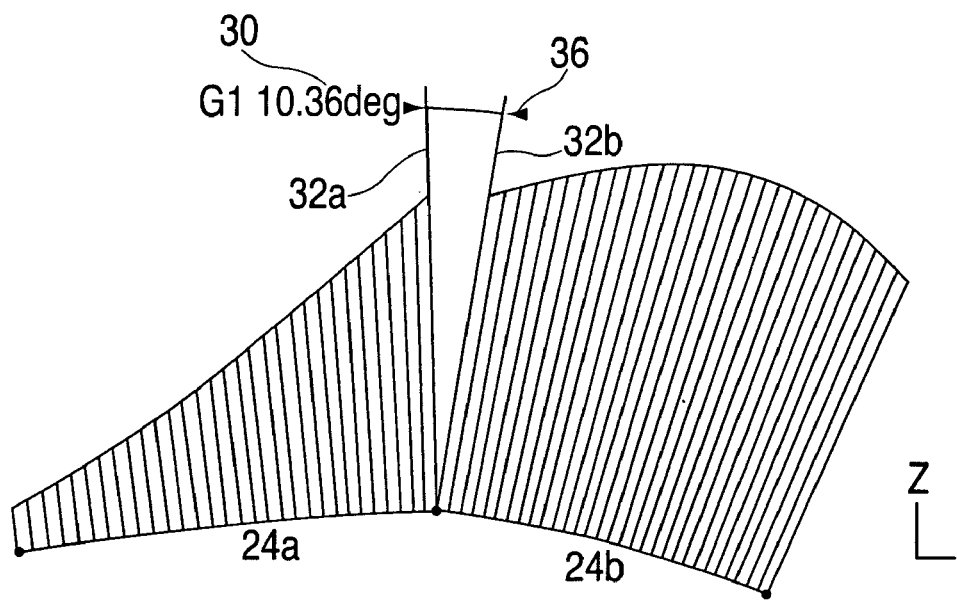
FIG. 4 is an illustration of a G1 discontinuity tag display for a pair of curves.
Figure 5:
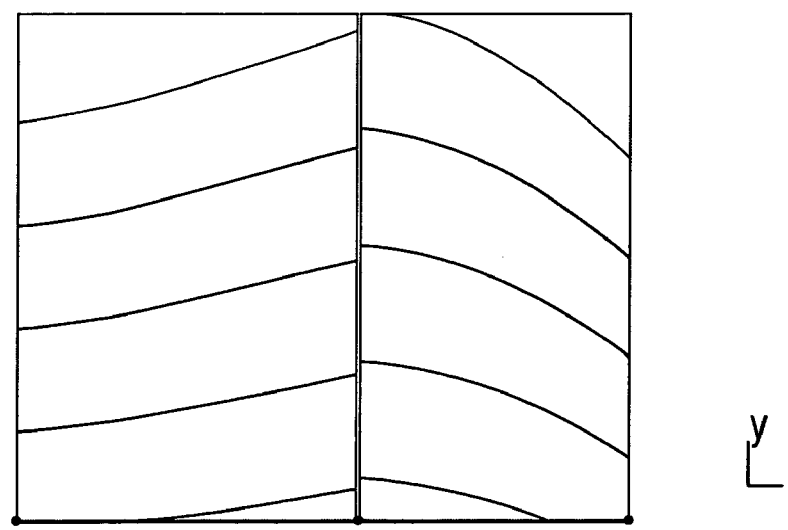
FIG. 5 is an illustration of a reflect curve display for surfaces corresponding to the curves of FIG. 4.

In FIG. 4, the curves 24A, 24B have been adjusted so that the two curves are connected at their end points and are therefore G0 continuous at the junction. However, the junction of the curves is not G1 continuous. FIG. 5 is an illustration of a reflect curve display for surfaces corresponding to the curves of FIG. 4. The surfaces in FIG. 4 can be defined in several ways, depending upon the circumstances. The surfaces can be extruded from the curves in order to permit the reflect curve display or one or both of the curves at issue could be part of the definition of a surface in the model and the defined surface used in the reflect curve display. In a further variation discussed in more detail below, the surfaces are defined separately in the model. The curves lie along the surfaces and are generated for purposes of displaying the continuity measures at various points on the intersection between the surfaces.

According to one aspect of the invention, the G1 discontinuity at the junction point is indicated by displaying a tag adjacent or near the point of discontinuity which indicates a measure of the angle between the normal vector 32A, 32B to each respective curve extending from the junction point. Preferably, lines 32A and 32B are displayed in a form which distinguishes them from elements of the curvature envelope and comb display. Lines 23A, 32B can be shown by themselves or in conjunction with the comb display. In a preferred embodiment, and as shown in FIG. 4, the lines can be extended beyond the edge of the curvature envelope. Alternatively, the lines 32A, 32B can be shown in different colors or widths. In order to achieve G1 continuity at the junction, a designer could adjust the shape of one or both of the curves 24A, 24B until the angle reaches substantially 0°. At that point, the normals and tangents to the curves at the junction point are co-linear and G1 continuity is achieved.

The G1 continuity angle can be indicated in various ways. For example, instead of emphasizing the angle relative to the normal vectors, the tangent to each curve at the junction point can be indicated. The magnitude of the angle does not need to be displayed as a numeric value but could also be indicated by means of various graphical icons. For example, an indicator bar can be shown having a length which is related to the magnitude of the G1 continuity angle. As the angle is adjusted, the length of the bar is changed accordingly. Other graphical indicators can also be used, such as a "fuel gauge" display. Preferably, the G1 continuity display is enabled only after the end points of the curves are within a certain minimum distance from each other, such as 0.001 millimeters.

Figure 6:
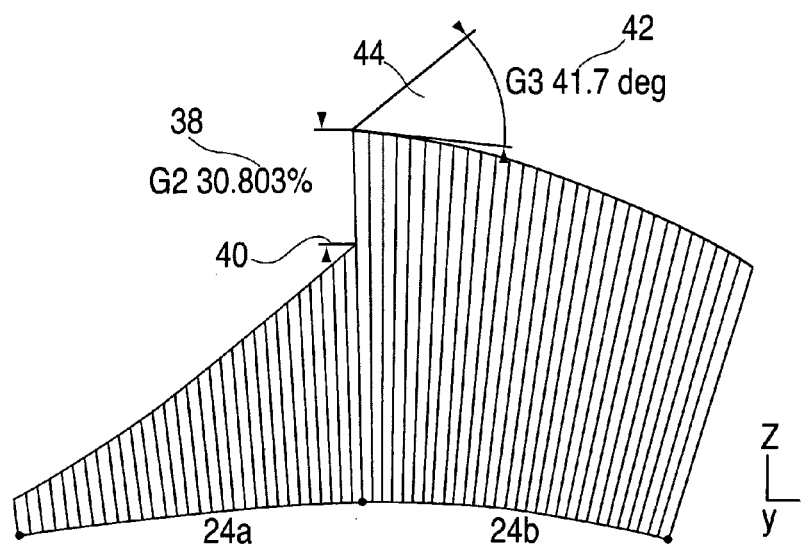
FIG. 6 is an illustration of a G2 and G3 tag display for a pair of curves having a G1 continuous junction and G2 and G3 discontinuities.
Figure 7:
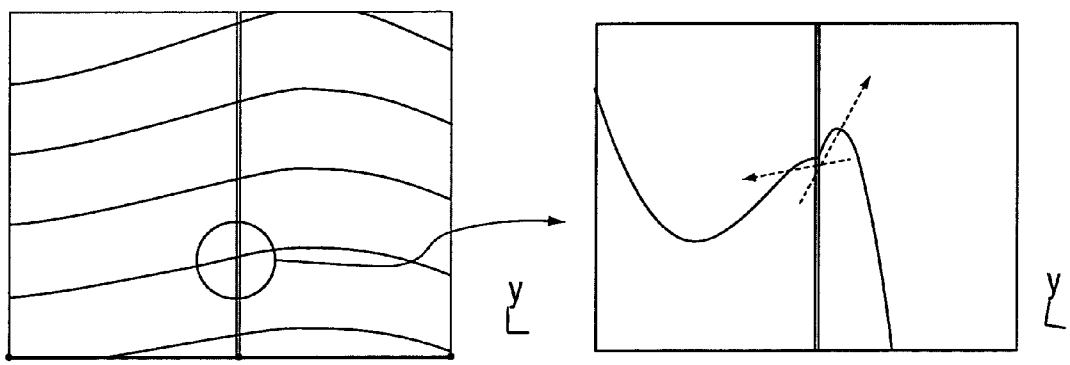
FIG. 7 is an illustration of a reflect curve display for surfaces corresponding to the curves of FIG. 6.

In FIG. 6, the shapes of the curves 24A, 24B have been adjusted to provide a G1 continuous junction. FIG. 7 is an illustration of a reflect curve display for surfaces corresponding to the curves of FIG. 6. As shown in the expanded portion of the reflect curve display in FIG. 7, there is a discontinuity in the surface at the junction between the curves.

Preferably, when the value of the G1 angle measurement reaches a pre-defined minimum or substantially 0, the G1 continuity tag is no longer displayed. Although the junction between curves 24A and 24B is G1 continuous, there is no G2 or G3 continuity. The G2 discontinuity is preferably shown as a tag 38 which indicates the percent difference in magnitude between the two curvature amplitude spikes at the junction. A graphical indicator 40 can be included to emphasize the difference in magnitude.

A G3 tag 42 is shown which indicates the magnitude of the G3 continuity measure. The measure illustrated in tag 42 is the angle between lines tangent to the curvature envelope of each respective curve at the junction point. To emphasize this angle, tangent lines 44 can be shown on or adjacent the curvature envelope. The angle may be shown in a numeric format or using a graphical format such as discussed above with regard to the G1 tag.

Figure 8:
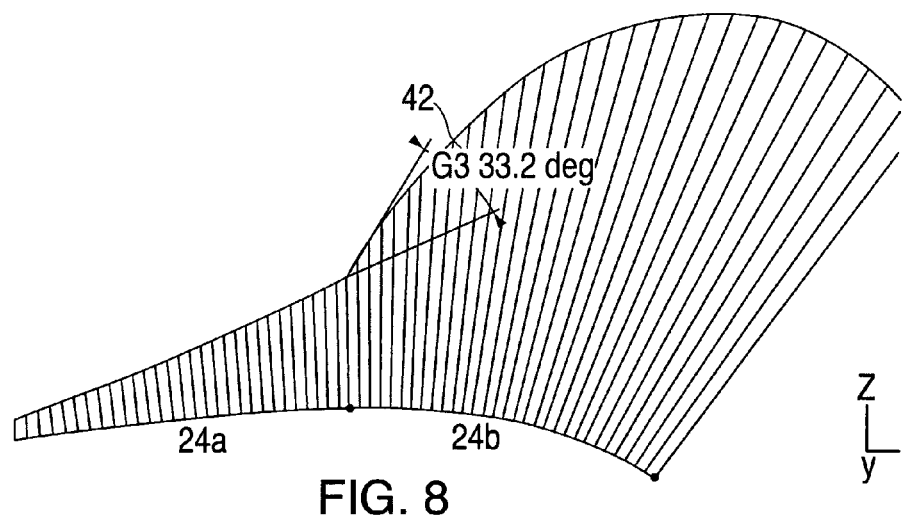
FIG. 8 is an illustration of a G3 tag display for a pair of curves having a G1 and G2 continuous junction with a G3 discontinuity.
Figure 9:
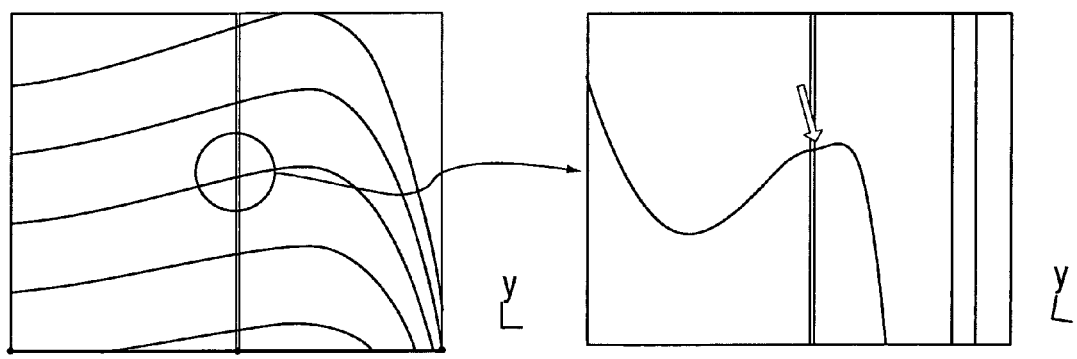
FIG. 9 is an illustration of a reflect curve display for surfaces corresponding to the curves of FIG. 8.

In FIG. 8 the curves 24A and 24B have been adjusted until the curvature amplitude at the junction point is substantially equal, therefore providing a G2 continuous junction. For reference, a reflect curved display of surfaces corresponding to the curves of FIG. 8 is shown in FIG. 9. Preferably, the G2 tag is no longer displayed after a G2 continuous junction is achieved.

Although the junction is G2 continuous, the curves still suffer from G3 discontinuity at the junction, the magnitude of which is visually indicated by the G3 tag 42. As indicated in the expanded view of the surface in FIG. 9, a discontinuity is still present in the reflect curve. However, without the presence of the G3 magnitude tag 42, detection of this discontinuity would be difficult using only the reflection curve feature provided by conventional graphical design systems.

Figure 10:
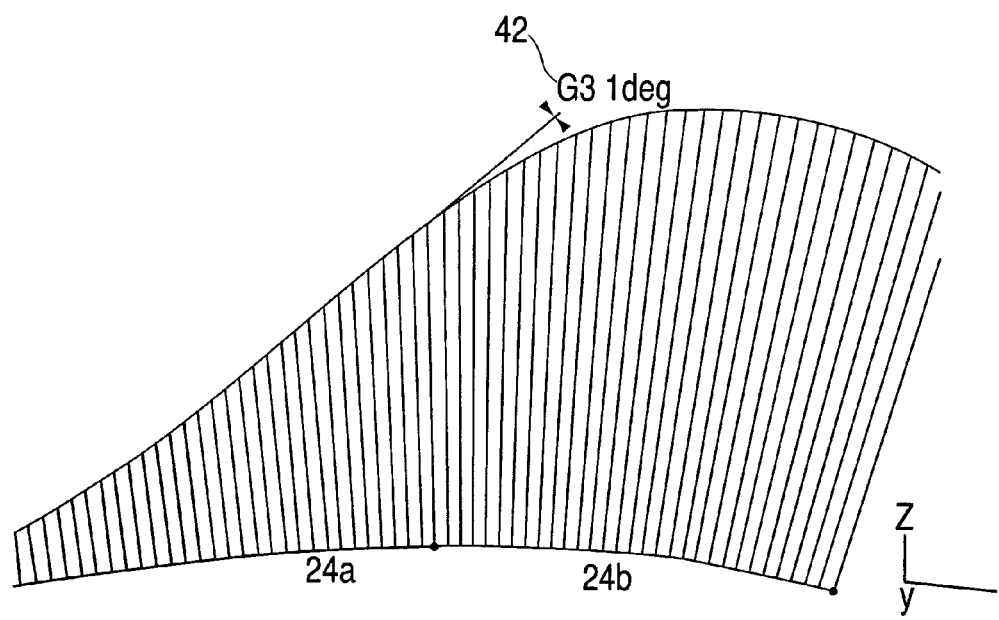
FIG. 10 is an illustration of a G3 tag display for a pair of curves having a junction which is G1 and G2 continuous and with substantially no G3 discontinuity.
Figure 11:
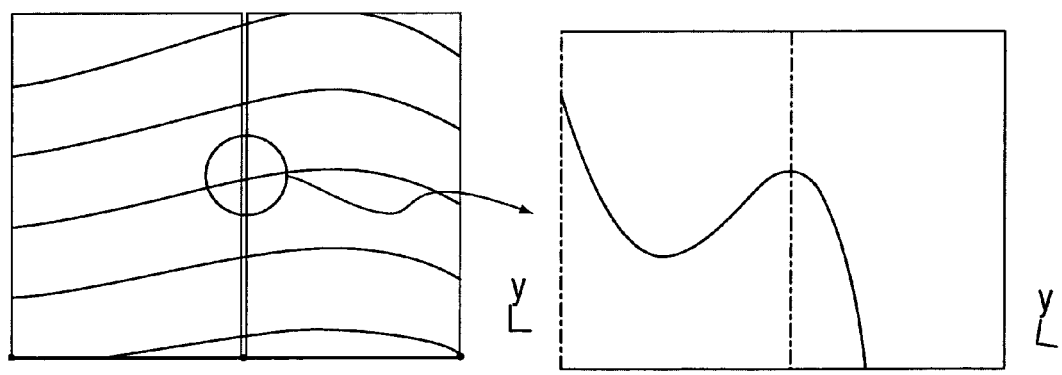
FIG. 11 is an illustration of a reflect curve display for surfaces corresponding to the curves of FIG. 10.

In FIG. 10, the curves have been adjusted to produce a junction which is nearly G3 continuous. FIG. 11 is the reflect display of surfaces corresponding to the curves of FIG. 10. As can be appreciated, the reflection curves on the surface are smooth and continuous across the junction. Advantageously, even though the curves in FIG. 10 do not have a perfect G3 continuous junction, use of continuity feedback tags in accordance with the invention permits a designer to determine when the junction continuity is close enough to continuous to meet applicable design requirements.

According to a further aspect of the invention, the manner in which a respective continuity tag is displayed can be varied depending on whether or not the respective continuity value is within a user defined tolerance. Preferably, the color of the tag or its background is changed. However, other changes in the tag display can also be triggered as the tolerance or other specified boundary is crossed. For example, a "low-precision" tag format, such as a graphical meter, can be used when the respective continuity value is far from the specified limit and a "high-precision" format, such as a numerical display, used when the continuity is less than the specified value.

Figure 12:
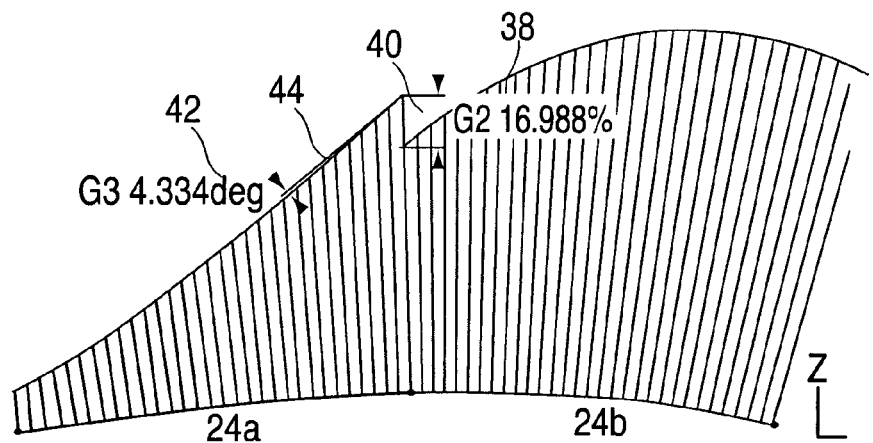
FIG. 12 is an illustration of a G2 and G3 tag display for a pair of curves having a G1 continuous junction, a G2 discontinuity gap, and a small apparent G3 continuity measure.
Figure 13:
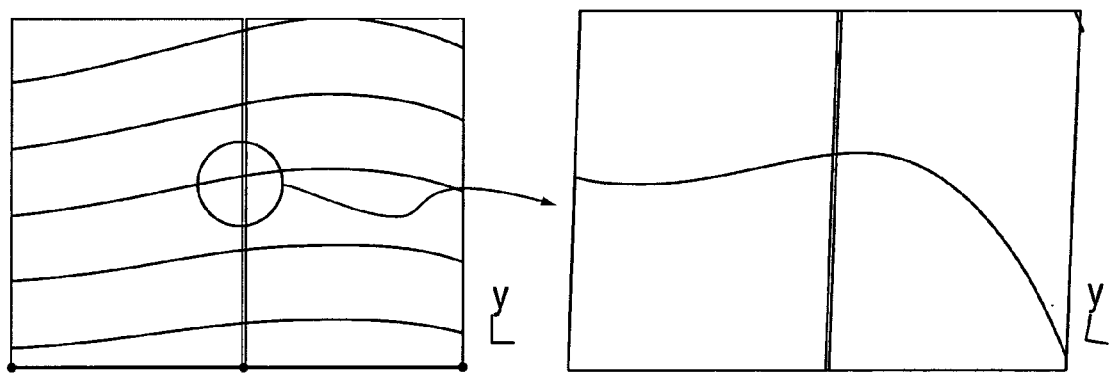
FIG. 13 is an illustration of a reflect curve display for surfaces corresponding to the curves of FIG. 12.

In some designs it can be impossible to adjust the shape of the curves to entirely eliminate a G2 or G3 discontinuity. A further aspect of the invention permits a designer to easily determine when the continuities between curvatures are within acceptable tolerance levels. For example, a G2 tolerance can be defined at 30% and a G3 tolerance at 1°. FIG. 12 is an example of curves 24A and 24B configured to have a junction which is G0 and G1 continuous but having a G2 discontinuity of about 17%. FIG. 13 is a reflect curve display for surfaces corresponding to the curves of FIG. 12.

Despite the G2 discontinuity, the G3 discontinuity at the curve junction in FIG. 12, however, is relatively small—about 4%. In many designs, a G2 discontinuity of between 20% to 30% can be present and still produce smooth reflection curve. The particular amount of discontinuity which can be tolerated is design dependent. When a large G2 continuity gap is tolerated, it is considerably more important that the designer be able to provide a good G3 continuity. However, because of the gap in the curvature envelopes caused by the G2 discontinuity, it can be very difficult for a designer to determine the quality of the G3 continuity by examining the curvature envelopes. While the reflect curve display may be somewhat helpful, it is also not a precise tool in this context since the quality of the reflect curves is effected by the acceptable G2 discontinuity. Advantageously, this problem is solved by use of the present invention since the tags clearly indicate the magnitude of the G2 discontinuity and the G3 discontinuity caused by the G2 gap such as shown in FIG. 12.

The present invention has been discussed largely with respect to the junction between curves. However, the invention can also be used to indicate the continuity quality at the junction or intersection between two surfaces. When two surfaces are joined, the system analyzes the continuity along the (generally curved) edge defined by the intersection of the surfaces by considering the continuity for one or more pairs of surface curves, each pair comprising curves lying on opposite sides of the intersection curve and joined at a point on the intersection curve.

Such surface curves can be part of the definition of the surfaces or can be representative curves generated by the system which are used for display purposes but which are not part of the actual model definition. For example, a pair of curves can be defined by the intersection of a cutting surface which passes through the junction of the surfaces and is preferably perpendicular to the intersection curve between the joined surfaces. The continuity at various points along the junction between the surfaces can be displayed. In one embodiment, a plurality of curve pairs are defined at periodic intervals along the surface intersection curve by a series of cutting surfaces or cutting planes, preferably parallel to each other, and which are spaced along the intersection curve at periodic intervals in a manner roughly analogous to the display of normal lines in a comb display. In an alternative embodiment, a user can "drag" the cutting surface or plane along the intersection curve and the continuity values for the pair of curves defined by the cutting plane displayed and updated as it is moved.

Figure 14:
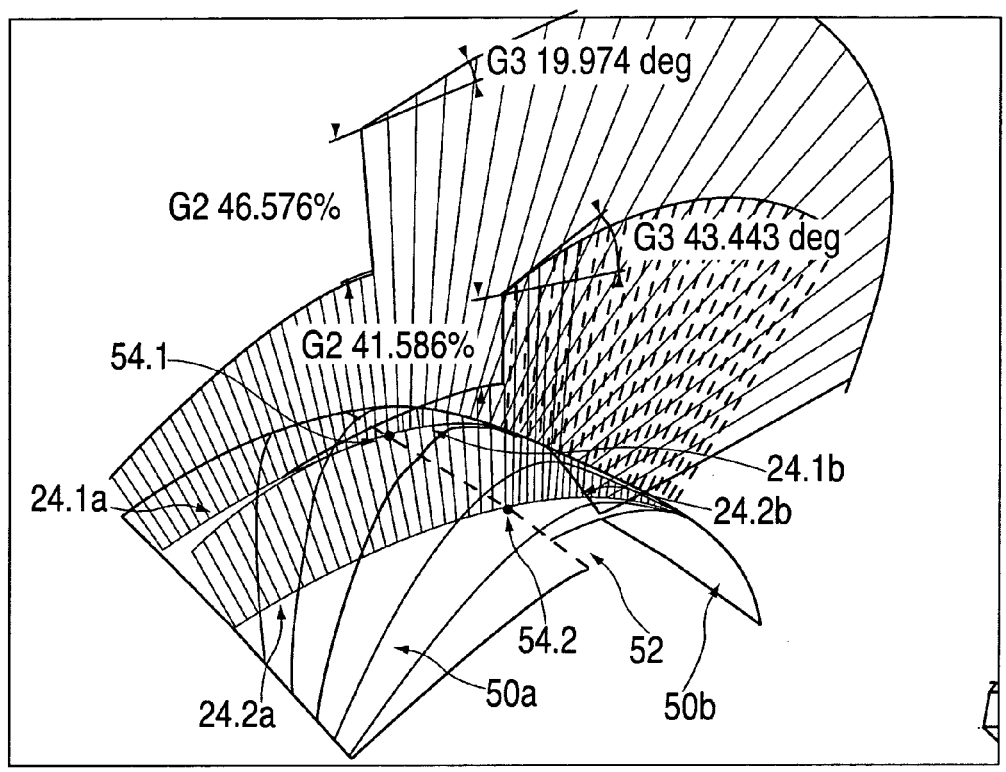
FIG. 14 is a screen display of a junction between two surfaces having continuity tags displayed in accordance with the present invention.

FIG. 14 is a sample screen display showing an intersection junction or curve 52 between two surfaces 50a, 50b. A first pair of curves 24.1a and 24.1b lie on surfaces 50a and 50b respectively and have a junction 54.1 at a point on the intersection curve 52. Similarly, a second pair of curves 24.2a and 24.2b lie on surfaces 50a and 50b respectively and have a junction 54.2 at a different point on the intersection curve 52. A reflect curve display is also indicated on the surfaces. The first and second pair of curves can be part of the definition of the surfaces 50a, 50b. Alternatively, the pairs of curves can be defined with reference to a pair of cutting surfaces which cross surfaces 50a, 50b at junction points 54.1 and 54.2 or a single cutting surface which has been dragged along the intersection curve 52 from point 54.1 to 54.2.

In accordance with this aspect of the invention, the appropriate continuity tags for each pair of curves 24.1a, 24.1b and 24.2a, 24.2b are displayed. The tags provide an indication of the continuity measures at various points along the intersection between the joined surfaces. As the definition of the surfaces 50a, 50b is adjusted, the continuity measures for the joined pairs of surface curves are re-determined and the tags updated accordingly. As a result, a designer can quickly determine the continuity quality at the surface junction and receive immediate feedback indicating how changes to a surface definition effects the continuity at various points along the intersection.

Figure 15:
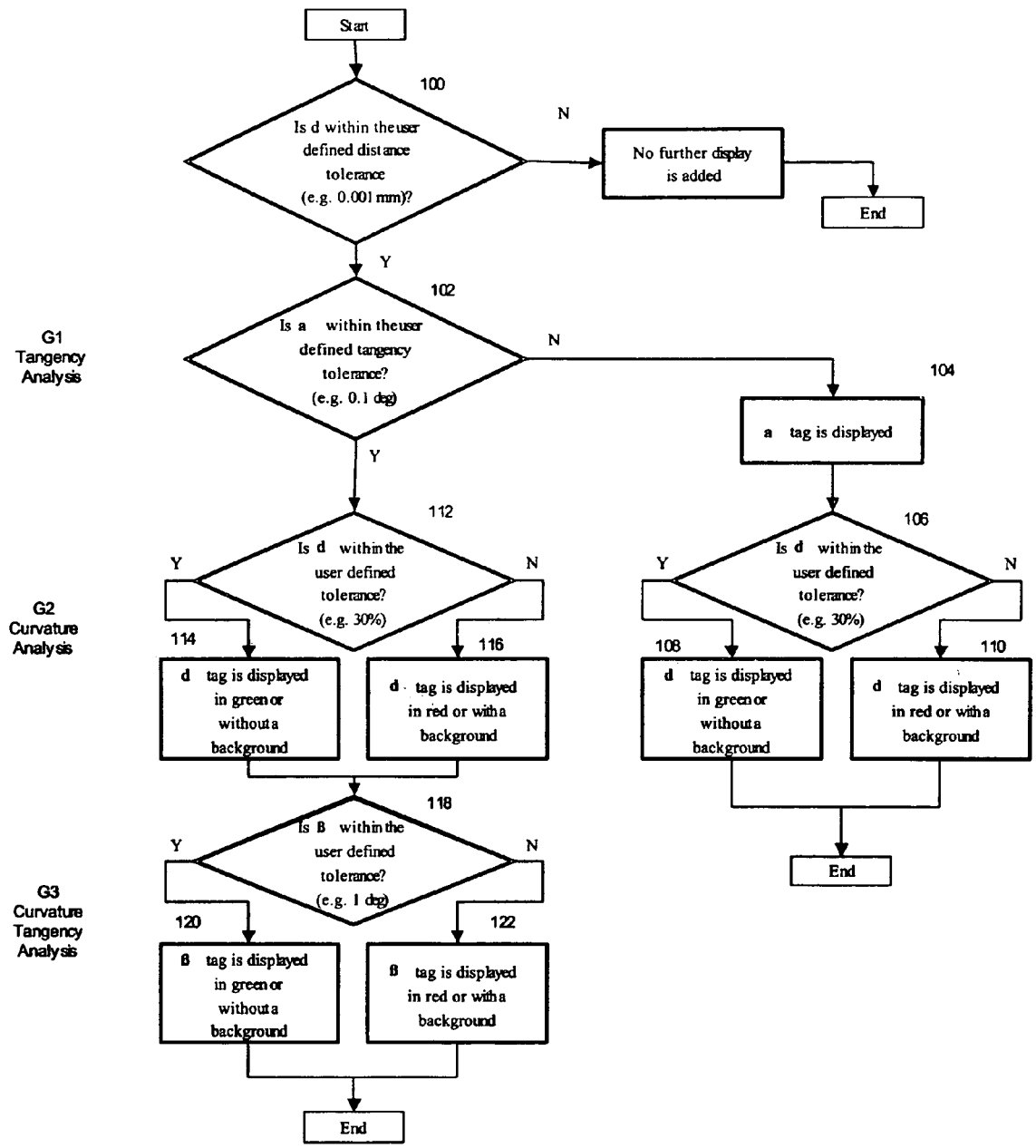
FIG. 15 is a flowchart summarizing a particular method of providing continuity feedback in accordance with present invention.

Turning to FIG. 15 there is shown a flow chart which summarizes a particular method of providing continuity feedback for continuity levels G1–G3 in accordance with the present invention. When a curve is being edited or is selected by a designer and the continuity feedback feature is enabled, a determination is made if a distance d between the end points of the selected curve and an adjacent curve is within a user defined G0 tolerance. (Step 100) If the two curves are not spaced within this tolerance, continuity tags are not displayed. If the two curves are within the defined tolerance, they are essentially G0 continuous at the junction and the value of the G1 continuity angle $\alpha$ is examined. (Step 102) If the value is not within a user defined G1 tolerance level, such as 0.1°, the G1 tag is displayed indicating the magnitude of the angle $\alpha$. (Step 104) The difference $\delta$ between the amplitudes of curvature for the two curves at the junction point is then displayed in a G2 tag. Preferably, the tag is displayed in one color or background if the value is within a user defined limit or tolerance, such as 30%, and in another color or background if the value is outside the specified limit. (Steps 106 through 110).

If the value of $\alpha$ is within the defined G1 tolerance level (step 102) then the curves can be considered to be G1 continuous and the G1 tag is preferably not displayed. The G2 value of $\delta$ is displayed in a format which depends on whether the value of $\delta$ is within the user defined G2 tolerance level. (Steps 112, 114, 116). The angle $\beta$ quantifying G3 continuity at the junction is then displayed in the G3 tag. If the value of $\delta$ is within a user defined tolerance level, such as 1°, the tag can be displayed in one color or background and alternatively displayed in a different color or background if the value is greater than the defined tolerance level. (Steps 118 through 122). The continuity values of $\alpha$, $\delta$, and $\beta$ can be calculated only when it is necessary to display the corresponding continuity tag or the continuity measurements can be calculated prior to making any determination regarding the display of the values.

In the preferred embodiment, the continuity tags are displayed when appropriate on a continual basis and are updated in substantially real-time as a designer modifies the corresponding curve or surface. In this manner, the system provides immediate and accurate feedback to the designer regarding the magnitude of various types of discontinuities which exist and permits the designer to quickly and easily assess how various modifications to the curves affect the continuities and to determine when the curves meet the applicable continuity requirements.

Although the preferred embodiment displays the continuity tags adjacent to the curvature envelopes of the curves at issue, the tags can be placed elsewhere in the display. For example, representations of the magnitude of various discontinuities can be illustrated elsewhere on the screen, such as in a "continuity window" which can be activated and moved to various places on the screen in accordance with a designer's preference. In a variation of the preferred embodiment, tags are displayed adjacent the curves (with or without the curvature envelope) only when the continuity values are within specified values, such as discussed above with regard to FIG. 15, while a separate continuity window displays the continuity values continuously regardless of whether the tags are displayed. Other techniques for displaying continuity values can also be used in alternative embodiments as will be appreciated by those of skill in the art.

A curve element in a graphical design system can be represented by a single defining equation. However, complex curves are typically parameterized into a plurality of curve segments, each of which has a simpler defining equation. In the event that a curve is represented both as a complex equation and in a parameterized form, preferably, the evaluation of the continuity measurements are made with respect to the parameterized representation of the curve.

The present invention is preferably implemented in software to be executed on an appropriate computing platform. However, the system can also be implemented using various hardware elements. The invention can be embodied in a computer program product, such as a computer disc, which contains computer instructions that, when loaded into an appropriate computing system, will configure the system to implement the present invention. While the invention has been described with reference to a particularly preferred embodiment thereof, variations in the implementation form and detail can be made without departing from the spirit and scope of the invention.

The invention claimed is:

1. A method for indicating curve connection continuity information in a graphical design system comprising the steps of:
    (a) receiving a definition of a first curve and a second curve, the first and second curves substantially meeting at a junction point;
    (b) displaying the first and second curves on a display device;
    (c) determining a G2 through Gn continuity value between the first and second curves at the junction point, $n \geq 3$; and
    (d) displaying at least one Gm tag indicating the value of Gm continuity, $2 \leq m \leq n$.

2. The method of claim 1 wherein the displaying step comprises displaying a G2 tag indicating the value of G2 continuity and a G3 tag indicating the value of G3 continuity.

3. The method of claim 1 wherein the displayed at least one Gm tag is displayed in association with the junction point.

4. The method of claim 1 wherein, if the measure of Gm continuity is less than a predefined value, the Gm tag is in a respective first display format and otherwise the Gm tag is in a respective second display format.

5. The method of claim 1, further comprising the steps of:
    determining a value of G1 continuity between the first and second curves at the junction point; and
    displaying a G1 tag indicating the value of G1 continuity.

6. The method of claim 5, wherein:
    the value of G1 continuity is an angle alpha between a first line normal to the first curve at the junction point and a second line normal to the second curve at the junction point;
    the G1 tag being displayed in association with the junction point.

7. The method of claim 6, wherein the G1 tag comprises a numeric indication of the angle alpha.

8. The method of claim 6, further comprising the step of displaying a representation of the first line and the second line, the G1 tag being displayed adjacent the representation.

9. The method of claim 1, further comprising the step of determining a value of G1 continuity between the first and second curves at the junction point;
    the step of displaying comprising displaying the G2 tag when a value of G1 continuity between the first and second curves at the junction point is less than a predefined G1 value.

10. The method of claim 1, wherein the value of G2 continuity is a difference delta between an amplitude of curvature of the first curve at the junction point and an amplitude of curvature of the second curve at the junction point.

11. The method of claim 10, wherein the G2 tag comprises a numeric indication of the difference delta.

12. The method of claim 10, further comprising the step of displaying a graphical representation of the difference in amplitude between the curvature of the first curve and the curvature of the second curve at the junction point, the G2 tag being displayed adjacent the representation.

13. The method of claim 1, further comprising the step of determining a value of G1 continuity between the first and second curves at the junction point;
    the step of displaying comprising displaying a G3 tag when the value of G1 continuity is less than a predefined G1 value.

14. The method of claim 1, wherein:
    a value of G3 continuity is an angle beta between a first line tangent to a curvature envelope of the first curve at the junction point and a second line tangent to a curvature envelope of the second curve at the junction point.

15. The method of claim 14, wherein the G3 tag comprises a numeric indication of the angle beta.

16. The method of claim 14, further comprising the step of displaying a representation of the first line and the second line, the G3 tag being displayed adjacent the representation.

17. The method of claim 1, wherein:
    the first curve lies on a first surface defined in the graphical design system;
    the second curve lies on a second surface defined in the graphical design system and intersecting the first surface;
    the first and second curves being coplanar with a cutting plane that intersects the first surface and the second surface, the junction point lying at the intersection between the first and second surfaces and the cutting plane.

18. The method of claim 17, wherein the first and second curves are defined by the intersection between the cutting plane and the first and second surfaces, respectively.

19. A graphical design system comprising
    a design editor;
    a display; and
    a storage area containing a graphical model having first and second curves substantially meeting at a junction point;
    the graphical design system further comprising a curve connection analyzer configured to:
    (c) determine a G2 through Gn continuity value between the first and second curves at the junction point, $n \geq 3$; and
    (c) signal the display system to display in conjunction with a display of the first and second curves, at least one Gm tag indicating the value of Gm continuity, $2 \leq m \leq n$.

20. The system of claim 19, wherein the curve connection analyzer is configured to signal the display system to display a G2 tag indicating the value of G2 continuity and a G3 tag indicating the value of G3 continuity.

21. The system of claim 19, wherein the at least one Gm tag is displayed in association with the junction point.

22. The system of claim 19, wherein, for a displayed Gm tag, the curve connection analyzer is configured to signal the display system to display the Gm tag is in a respective first display format if the measure of Gm continuity is less than a predefined value, and otherwise signal the display system to display the Gm tag in a respective second display format.

23. The system of claim 19, wherein the curve connection analyzer is further configured to:
    determine a value of G1 continuity between the first and second curves at the junction point; and
    display a G1 tag indicating the value of G1 continuity.

24. The system of claim 23, wherein the value of G1 continuity is an angle alpha between a first line normal to the first curve at the junction point and a second line normal to the second curve at the junction point;
the curve connection analyzer being configured to signal the display system to display the G1 tag in association with the junction point.

25. The system of claim 24, wherein the G1 tag comprises a numeric indication of the angle alpha.

26. The system of claim 24, wherein the curve connection analyzer is configured to signal the display system to display a representation of the first line and the second line and display the G1 tag adjacent the representation.

27. The system of claim 19, wherein the value of G2 continuity is a difference delta between an amplitude of curvature of the first curve at the junction point and an amplitude of curvature of the second curve at the junction point.

28. The system of claim 27, wherein the curve connection analyzer is further configured to:
determine a value of G1 continuity between the first and second curves at the junction point; and
signal the display system to display the G2 tag when the value of G1 continuity is less than a predefined G1 value.

29. The system of claim 27, wherein the G2 tag comprises a numeric indication of the difference delta.

30. The system of claim 27, wherein the curve connection analyzer is configured to signal the display system to display a graphical representation of the difference in amplitude between the curvature of the first curve and the curvature of the second curve at the junction point and display the G2 tag adjacent the representation.

31. The system of claim 19, wherein the curve connection analyzer is configured to:
determine a value of G1 continuity between the first and second curves at the junction point; and
signal the display system to display a G3 tag when the value of G1 continuity is less than a predefined G1 value.

32. The system of claim 19, wherein:
the value of G3 continuity is an angle beta between a first line tangent to a curvature envelope of the first curve at the junction point and a second line tangent to a curvature envelope of the second curve at the junction point.

33. The system of claim 32, wherein a G3 tag comprises a numeric indication of the angle beta.

34. The system of claim 32, wherein the curve connection analyzer is configured to signal the display system to display a representation of the first line and the second line and display a G3 tag adjacent the representation.

35. The system of claim 19 wherein:
the first curve lies on a first surface defined in the graphical model;
the second curve lies on a second surface defined in the graphical model and intersecting the first surface; and
the first and second curves coplanar with a cutting plane that intersects the first surface and the second surface, the junction point lying at the intersection between the first and second surfaces and the cutting plane.

36. The system of claim 35, wherein the first and second curves are defined by the intersection between the cutting plane and the first and second surfaces, respectively.

37. A method for indicating curve connection continuity information in a graphical design system comprising the steps of:

(a) receiving a definition of a first curve and a second curve, the first and second curves substantially meeting at a junction point;
(b) displaying the first and second curves on a display device;
(c) determining values of G1 continuity, G2 continuity, and G3 continuity between the first and second curves at the junction point;
(d) if the value of G1 continuity is greater than a predefined G1 value, displaying a G1 tag in association with the junction point indicating the value of G1 continuity;
(e) displaying a G2 tag in association with the junction point indicating the value of G2 continuity, the G2 tag being in a first format if the value of G2 continuity is greater than a predefined G2 value and otherwise being in a second format;
(f) if the value of G1 continuity is not greater than a predefined G1 value, displaying a G3 tag in association with the junction point indicating the value of G3 continuity, the G3 tag being in the first format if the value of G3 continuity is greater than a predefined G3 value and otherwise being in the second format.

38. The method of claim 37, wherein:
the G1 tag comprises a numeric indication of an angle between a line normal to the first curve at the junction point and a line normal to the second curve at the junction point;
the G2 tag comprises a numeric indication of a percent difference between an amplitude of curvature of the first curve at the junction point and an amplitude of curvature of the second curve at the junction point; and
the G3 tag comprises a numeric indication of an angle between a line tangent to a curvature envelope of the first curve at the junction point and a line tangent to a curvature envelope of the second curve at the junction point.

39. A method for indicating surface connection continuity information in a graphical design system comprising the steps of:
receiving a definition of a first surface and a second surface intersecting the first surface, the intersection between the first and second surfaces defining an intersection edge;
specifying at least one cutting plane that intersects the first surface and the second surface, the intersection between a respective cutting plane and the first and second surfaces defining a respective first and second curve lying on the first and second surfaces, respectively, and meeting at a respective junction point where the cutting plane crosses the intersection edge;
for each pair of first and second curves:
(a) determining a G2 through Gn continuity value between the first and second curves at the junction point, $n \geq 3$; and
(b) displaying at least one Gm tag indicating the value of Gm continuity, $2 \leq m \leq n$.

40. The method of claim 39, further comprising the step of displaying the first and second curves in each pair of curves.

41. The method of claim 39, wherein the at least one Gm tag is displayed in association with the respective junction point.

42. The method of claim 39, wherein a plurality of cutting surfaces are specified and which cross the intersection edge at periodic intervals.

43. A graphical design system comprising
a design editor;
a display; and
a storage area containing a graphical model having first and second intersecting surfaces, the intersection between the first and second surfaces defining an intersection edge;
the graphical design system further comprising a curve connection analyzer configured to, for a specified pair of curves comprising a first curve lying on the first surface and a second curve lying on the second surface, the first and second curves meeting at a junction point lying on the intersection edge:
  (a) determine a G2 through Gn continuity value between the first and second curves at the junction point, $n \geq 3$; and
  (b) signal the display system to display in conjunction with a display of the first and second surfaces at least one Gm tag indicating the value of Gm continuity, $2 \leq m \leq n$.

44. The system of claim 43, wherein the first curve is part of the definition of the first surface in the graphical model.

45. The system of claim 43, wherein at least a portion of the first and second curves are displayed on the display, the G2 tag and G3 tag being displayed in association with the junction point.

46. The system of claim 43 wherein the first and second curves are defined by the intersection between a cutting surface and the first and second surface respectively.

* * * * *